MAGNETIC TRANSDUCING APPARATUS

Filed March 21, 1946 3 Sheets-Sheet 1

INVENTOR.
FREEMAN H. OWENS
BY James & Franklin

MAGNETIC TRANSDUCING APPARATUS

Filed March 21, 1946 3 Sheets-Sheet 2

INVENTOR.
FREEMAN H. OWENS
BY James & Franklin

July 4, 1950 F. H. OWENS 2,513,423

MAGNETIC TRANSDUCING APPARATUS

Filed March 21, 1946 3 Sheets-Sheet 3

INVENTOR.
FREEMAN H. OWENS
BY James & Franklin

Patented July 4, 1950 2,513,423

UNITED STATES PATENT OFFICE 2,513,423

MAGNETIC TRANSDUCING APPARATUS

Freeman H. Owens, New York, N. Y.

Application March 21, 1946, Serial No. 655,965

29 Claims. (Cl. 179—100.2)

This invention relates to a magnetic tape recording and reproducing apparatus and particularly to one in which a plurality of sound tracks may be recorded on and reproduced from the same tape.

It is the prime object of the present invention to provide such an apparatus which is of extremely compact construction, so that the entire apparatus may be portable.

It is a further object of the present invention to provide means whereby a plurality of sound tracks may be recorded on and reproduced from a single magnetic tape, thus materially increasing the capability of the apparatus.

It is still another object of the present invention to minimize all frictional effects between the magnetic contact making means and the magnetic tape, so that the tape may be used over and over again without appreciable wear and consequent necessity for replacement and so that the magnetizing means may be similarly long-lived.

It is still another object of the present invention to so construct the magnetizing elements of my apparatus as to conveniently limit the width of each sound track on the tape in order that the sound tracks thereon do not interfere with one another.

It is yet another object of my invention to provide means for automatically and conveniently moving the magnetizing means from one sound track position to the next.

It is another object of the present invention to eliminate any frictional effect between the magnetizing means and the tape during the time that the magnetizing means is moving from one sound track position to another, again with material gain in durability both of the tape and the magnetizing means.

A further object of the present invention is to control the motion of the magnetizing means from one sound track position to another by the amount of magnetic tape available.

It is yet another object of the present invention to produce a device in which the amount of tape available not only controls the above-mentioned function but also acts to reverse the direction of motion of the tape past the magnetizing means, so that automatic and substantially continuous recording and/or reproducing can be obtained over an exceedingly long period of time before replacement of the tape is necessitated.

Another object is to produce a device in which, when the amount of tape available for recording is becoming small, warning devices notify the recorder of that fact.

It is a still further object of the present invention to provide magnetizing means for such an apparatus novel in arrangement, the same structure being capable of functioning as recording head, reproducing head, or erasing head, at the will of the operator.

To the accomplishment of the foregoing objects and such other objects as may hereinafter appear, my present invention relates to the magnetic tape sound recording and reproducing apparatus as sought to be defined in the appended claims, as described in the specification and in the drawings appended thereto, in which:

*Generic description*

Turning now to a description of the invention, and first to a generic description thereof, my apparatus comprises a magnetizable metal tape A and a magnetizing means, generally designated as B, so positioned with respect to the tape A as to be capable of cooperating with the magnetic status of said tape A to either alter the magnetic status of that tape, as in the case of recording, or to reproduce electrically the magnetic variations thereof, as in the case of reproduction. By suitably energizing the magnetic means B it may also serve to remove or erase all or a part of the magnetic variations of said tape A, and thus render said tape ready to receive fresh recordings thereon, all in a manner well-known in the prior art.

Contact between the magnetizing means B and the tape A is effected by contacting means comprising a magnetizable body C, here shown as a disc, so mounted in said magnetizing means B as to be in contact with the tape A and rotatable in its mounting as the tape A moves past said magnetizing means. The tape motion is accomplished by a drum D, rotated by the motor E and carrying on its surface in contact with the tape A at least one circumferential rib F of a width closely the same as the desired width of a sound track.

Figure 3:
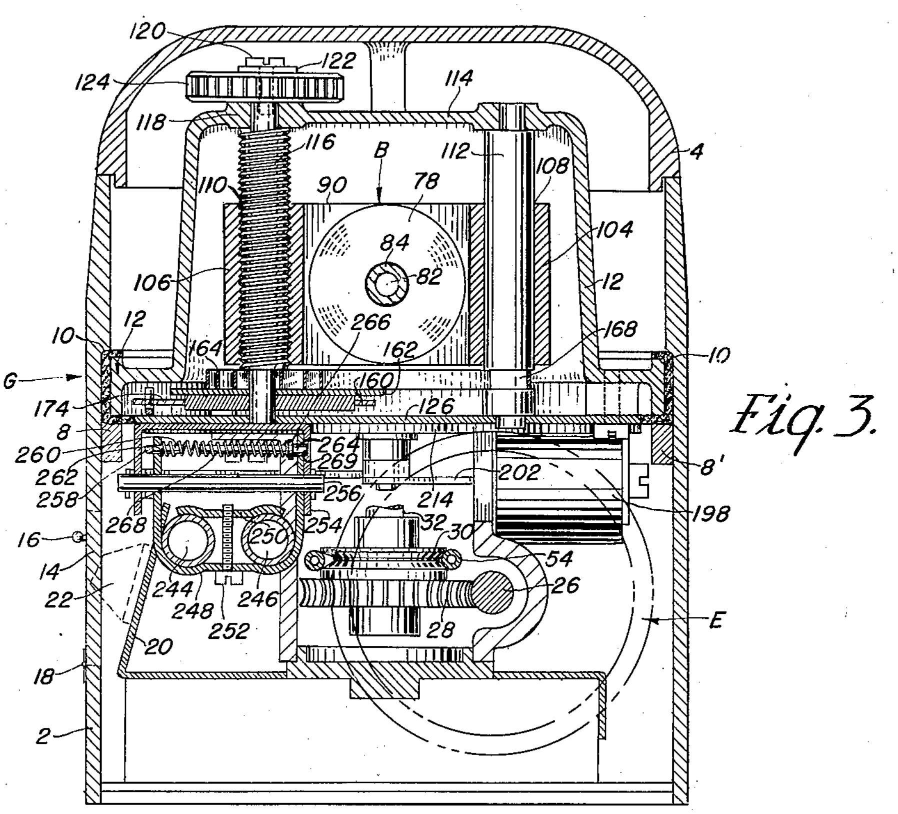
Fig. 3 is an end view taken along the line 3—3 of Fig. 1.
Figure 4:
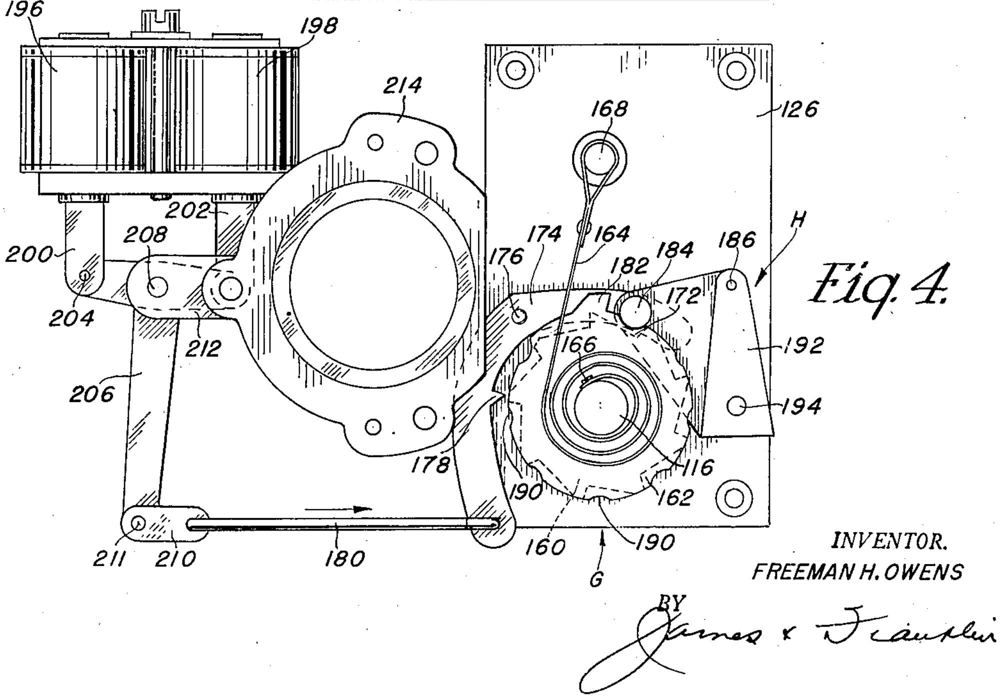
Fig. 4 is a schematic view of part of the apparatus employed to move the magnetizing means from one sound track position to another.

A sound track selection means, generally designated as G, and illustrated particularly in Figs. 3 and 4, moves the magnetizing means B and the contacting means C carried therein transversely with respect to the tape A from one sound track position to another, and a retracting means, generally designated as H, acts to eliminate contact between the contacting means C and the tape A during the time that said contacting means is being moved from one sound track position to another. In a preferred embodiment of my invention, the circumferential ribs F on the drum D will be spaced one from the other corresponding to the dimensions and position of sound tracks to be carried by the tape A (here shown for purposes of exemplification as 8 tracks), and the contacting means C will be in a sound track position whenever it is substantially in registration with one of said ribs F.

The operation of the track-selection means G is automatically controlled by a combined actuating and warning means, generally designated as J (see Fig. 1), which in turn is controlled by the supply of tape A available in the apparatus. Said actuating means J also controls the direction of rotation of the motor E and consequently controls the direction of motion of the tape A past the contacting means C.

*General structure*

The recording and reproducing apparatus of my invention comprises a chassis 2 and a vertically removable top cover therefor 4. Resting on flanges 6, 6' and 8, 8' extending respectively transversely and longitudinally with respect to said chassis 2 and resiliently supported thereon by the rubber gasket 10 is a framework, generally designated as 12, which supports and holds in operative relation all of the other parts of the apparatus.

Appropriately placed on the chassis 2 is an access door 14 which may, by means of handle 16, be rotated about hinges 18 so as to render accessible an inclined control panel 20 inside of the apparatus which houses the recording microphone 22 (shown in phantom in Fig. 3), the reproducing loud speaker (not shown), the various switches and controls necessary for operation of the apparatus (also not shown), and may also optionally house the warning lights hereinafter to be described.

Figure 2:
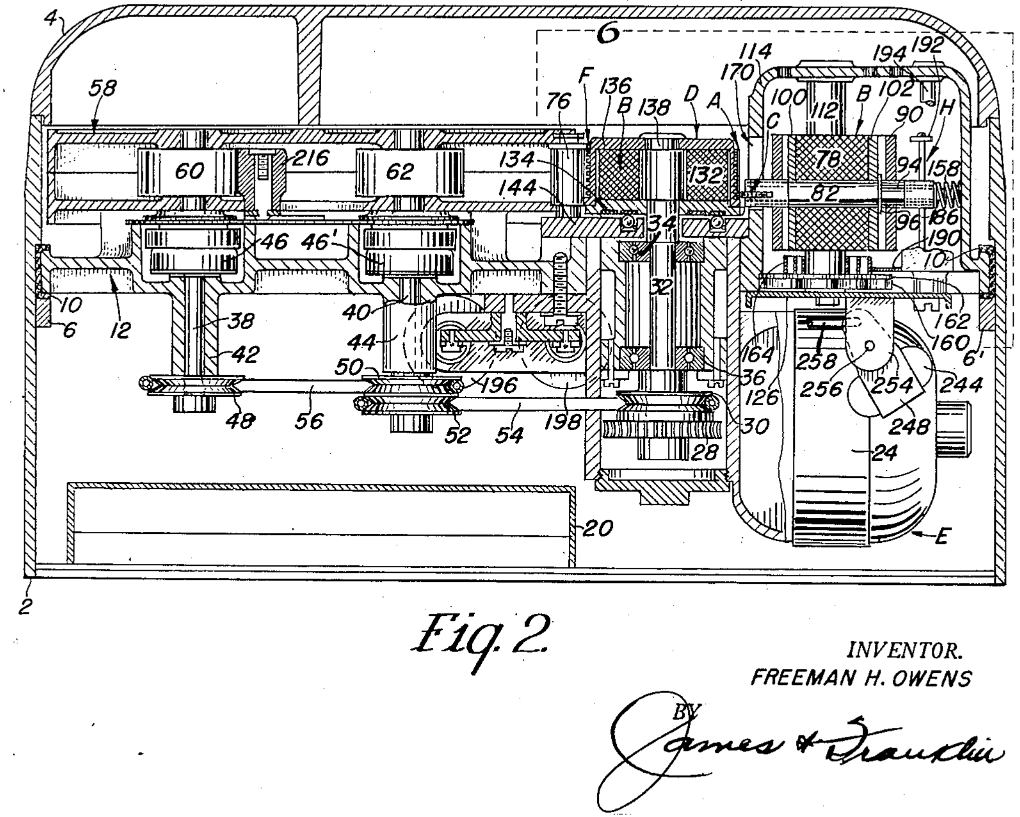
Fig. 2 is a side view taken along the line 2—2 of Fig. 1.

The motor E is supported in housing 24 (part of which is broken away in Fig. 2) in such a manner that worm 26 attached to the motor shaft (see Fig. 3) meshes in driving relation with worm wheel 28. To this wheel is attached friction pulley 30 and shaft 32, the latter being mounted in the framework 12 by means of ball bearing units 34 and 36 (see Fig. 2). At its upper extremity the shaft 32 is attached to drum D so that rotation of the motor E rotates the drum D in a direction and at a speed determined by the direction and speed of rotation of the motor E.

Shafts 38 and 40 (see Fig. 2) are rotatably mounted in bushings 42 and 44 respectively and each carries at its upper end a clutch and drive assembly 46, 46' of any suitable internal construction such that rotation of the shafts 38 and 40 in one direction will be transmitted through the clutch and drive assembly 46 or 46' while rotation of said shafts 38 and 40 in the opposite direction will not be so transmitted. The purpose of such an arrangement will be made clear hereinafter.

Attached to the lower extremity of shaft 38 is a friction pulley 48, and attached to the lower extremity of shaft 40 are friction pulleys 50 and 52. Friction pulley 52 is mounted coplanar with friction pulley 30, and spring belt 54 connects the two in driving relationship. Friction pulley 48 is positioned coplanar with friction pulley 50, and spring belt 56 connects the two in driving relationship.

Thus it will be apparent that rotation of the motor E will rotate shaft 32 by means of worm 26 and worm wheel 28, thus rotating the drum D and friction pulley 30. By means of spring belt 54 friction pulley 52 will be rotated thus rotating shaft 40 and friction pulley 50, and by means of spring belt 56 that rotation will in turn be transmitted to friction pulley 48 and shaft 38. All three of the shafts 32, 38 and 40 will rotate in the same direction, that direction being determined by the direction of rotation of the motor E.

The magnetic tape A may be housed in a removable magazine, generally designated as 58, and is wound on spools 60 and 62 therein. In passing from one spool to the next the tape passes over rollers 64, 66 and 68 (see Fig. 1). The magazine is concavely cut away at one end between the rollers 66 and 68, as at 70, in order to permit access to the tape A at that point, the point nearest the drum D, in order that the tape A may be threaded over the drum D in a manner hereinafter to be described.

When the magazine 58 is in its proper position on the apparatus, the lower ends of the spools 60 and 62 will be engaged in an appropriate manner by the driven ends of the drive and clutch assemblies 46, 46'. In order to ensure accurate positioning of the magazine 58 on the apparatus and in order to ensure that when once positioned it will remain in its proper position so long as desired, the framework 12 is provided with a projecting pin 72 adapted to fit into a suitably placed orifice in the magazine 58.

Figures 1, 8:
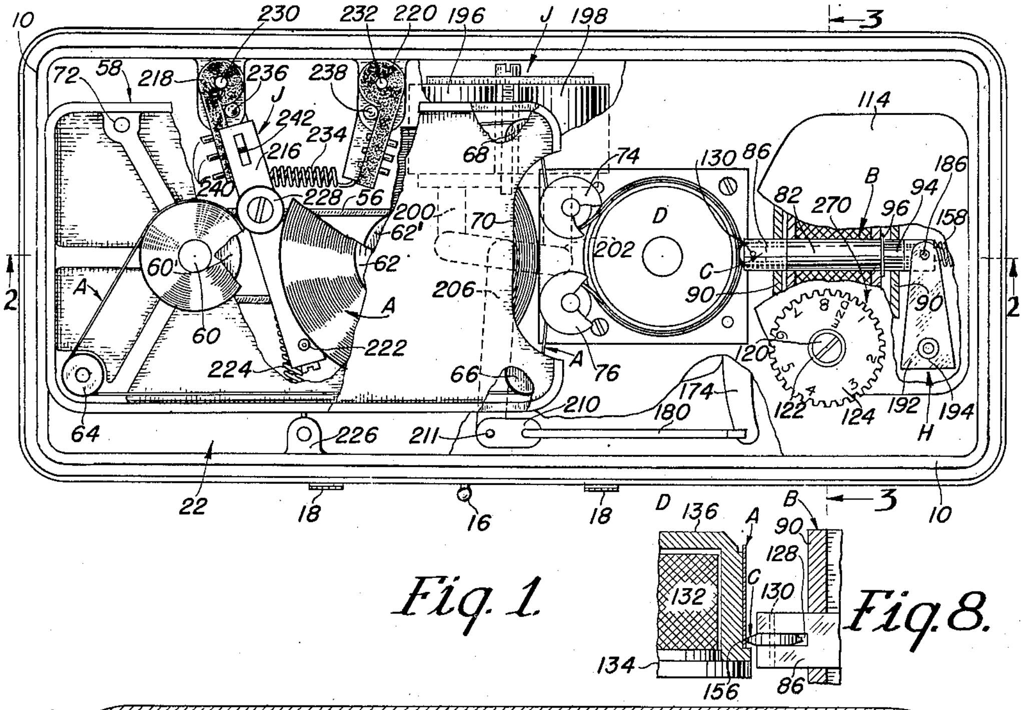
Fig. 1 is a top view, with portions of the surface thereof broken away, of the recording and reproducing apparatus of my invention after the top has been removed.
Fig. 8 is a side view, similar to Fig. 6, of an alternative embodiment of the magnetizing means.

Each spool 60, 62 comprises two concentric discs 60, 60' and 62, 62' respectively, as may best be seen in Fig. 1, so that the ends of the tape A may be secured to the spools by being bent between said two concentric discs, in a manner well-known in the art.

Threading of the tape A over the drum D is accomplished as shown in Fig. 1, the tape first being threaded inwardly with respect to the two flanged guide rollers 74 and 76 and then threaded over the outer circumference of the drum D.

Figure 5:
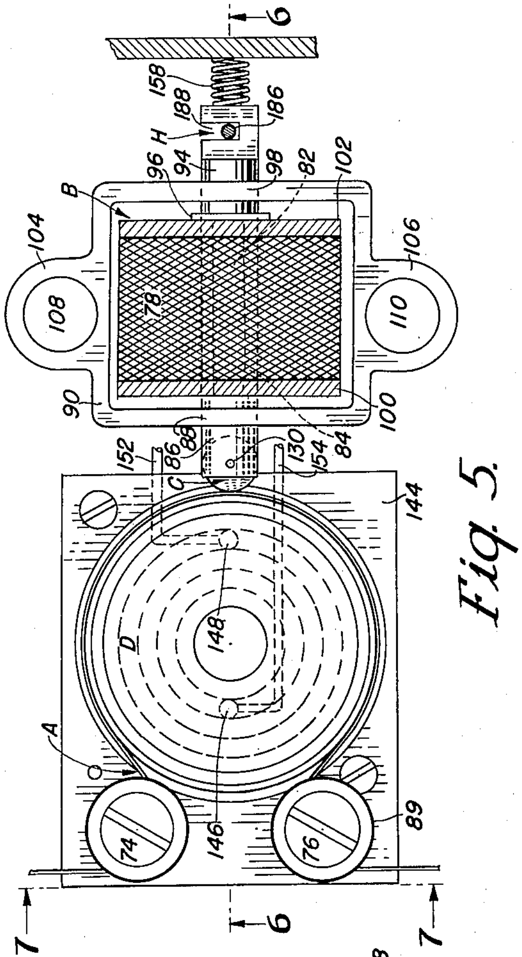
Fig. 5 is a detailed view on an enlarged scale, taken from above, of one embodiment of the magnetizing means.
Figure 6:
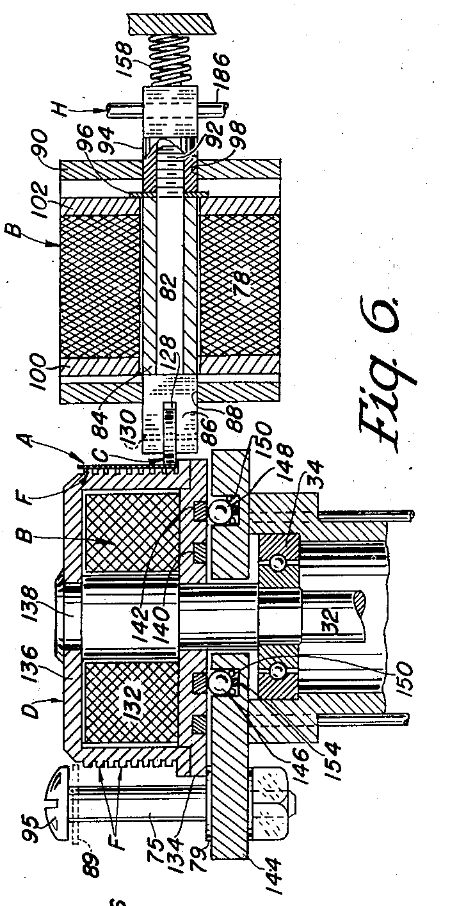
Fig. 6 is a cross-sectional view thereof, taken along the line 6—6 of Fig. 5.
Figure 9:
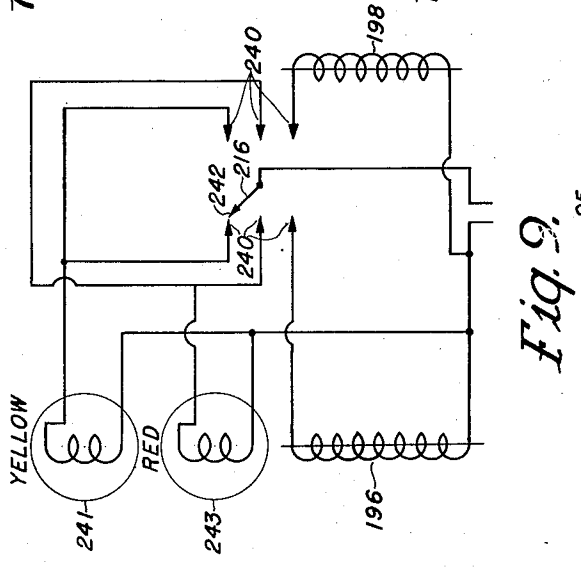
Fig. 9 is a circuit diagram of the actuating and warning means of the present invention.
Figure 7:
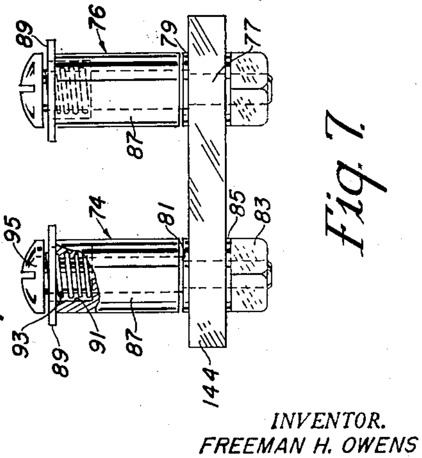
Fig. 7 is a detailed end view, taken along the line 7—7 of Fig. 5, of the guide rollers.

Fig. 7 illustrates a detailed construction of the guide rollers 74 and 76. Each guide roller assembly comprises a stud 75 having a lower portion 77 of smaller diameter than the rest of the stud which projects through a suitable aperture in the base plate 144. Washer 79 cooperates with the shoulder 81 between the upper and lower portions of the stud. The stud is secured to the base plate 144 by means of bolt 83 and washer 85 attached to that part of the lower portion 77 which projects below the base plate 144. Rotatably mounted around the stud 75 is the roller 87 provided at its upper end with an integral flange 89. The upper portion of the roller is countersunk, as at 91, and a spring 93 under compression between the countersunk portion 91 of the roller 87 and the screw head 95 of the stud 75 tends to force the roller 87 downwardly toward the base plate 144. The flange 89 is of such a dimension as to overlie the protruding ends of the circumferential ribs F on the drum D (see Fig. 5 and dotted lines in Fig. 6) so as to prevent the tape A, during operation of the apparatus, from moving up on the drum D and thus making uncertain the accurate positioning of the sound tracks thereon. The spring 93, in tending always to force the roller 87, and consequently the flange 89, down, fixes the position of the tape A with respect to the drum D. In order to permit initial threading of the tape A, the roller 87 may be manually forced upward against the tension of the spring 93, thus providing a clearance between the flanges 89 and the drum D, so that the tape A may be inserted therebetween. Upon release of the manual pressure thus applied, the springs 93 will again be controlling, the roller 87 and flanges 89 will be forced down, and the tape A will be maintained in its proper position.

With the tape in the relative position with respect to the spools 60 and 62 as shown in Fig. 1, and assuming that it is desired to take up the tape on spool 60, it is apparent that spool 60 must rotate in clockwise direction. Drum D must also rotate in a clockwise direction, and in order for the tape A to unwind from spool 62 it must rotate in the same direction. If the tape A is to move past the magnetizing means B and contacting means C at a constant speed, as is necessary if fidelity of reproduction is to be obtained, the respective spools 60 and 62 must rotate at varying rotational speeds dependent upon the effective distance of the tape A from the center of said spools, that is to say, spool 60 as shown in Fig. 1 must rotate much more rapidly than spool 62. However, as the tape accumulates on spool 60 that spool must rotate at a decreased speed, and as the tape unwinds from spool 62 that spool must rotate at an increased speed, if the linear speed of motion of the tape A past the magnetizing means B is to remain constant.

The motor E is a constant-speed motor and, since it is directly geared to the drum D, that drum will rotate at constant speed. The motion of the motor E is transmitted to the shafts 38 and 40, thence to the clutch and drive assemblies 46 and thence to the spools 60 and 62 by means of spring belts 54 and 56 which drive friction pulleys 30, 52, 50 and 48, as above described. Since these springs belts 54 and 56 may slip with respect to their driven and driving friction pulleys, they will drive the spools 60 and 62 at varying speeds throughout the winding and unwinding of the tape A from one spool to another and thus the tape A will move in non-slipping relationship to the drum D and, consequently, at a constant linear speed with respect to the magnetizing means B.

In order to further facilitate the variation in rotational speeds of the spools 60 and 62, the drive and clutch assemblies 46, 46′ for the two spools are so constructed that they will transmit to their respective spools motions of their driving shafts only when those motions are in a direction appropriate for the winding or taking up operation of their spools, but will not transmit motion in a direction suitable for unwinding, the spools 60 and 62 being free to rotate in such direction. Thus the drive and clutch assembly 46 for spool 60 will transmit clockwise rotation of the shaft 38, so that spool 60 can be driven to wind tape thereon, but will not transmit counter-clockwise rotation of the shaft 38. When shaft 38 rotates in a counter-clockwise direction, the spool 60 is free to rotate as it wishes, being declutched from its driving shaft 38. Similarly, the drive and clutch assembly 46′ for the spool 62 will only transmit counter-clockwise rotation of the shaft 40 to the spool 62 and when, as in the example given, the shaft 40 is rotating in a clockwise direction, the spool 62 is declutched therefrom and is free to rotate at any speed necessary to unwind the tape A therefrom. Consequently, during a winding opeartion, slippage need occur in the driving mechanism only with respect to the winding spool; the unwinding spool is declutched from its shaft, free to rotate, and the speed of rotation of its shaft is of no importance.

The drive and clutch assemblies 46, 46′ may be, for example, of conventional three-ball type, and may also be provided with frictional relief characteristics in the manner well-known in the art.

*Magnetizing means and contacting means*

The tape A is of magnetizable material such that it is adapted to carry one or more longitudinally disposed sound tracks, said tracks being formed by altering the magnetic properties of the tape A in accordance with the sound vibrations to be recorded. If a plurality of sound tracks are to be recorded on the same tape A, and the apparatus of my invention is particularly adapted thereto, these tracks are spaced one from the other transversely with respect to the tape A and each track may extend over any desired longitudinal portion thereof. Thus if each sound track is of a length requiring for example 15 minutes to be completely run through the apparatus, if 8 sound tracks are recorded thereon the same tape A can be used for recording or reproducing over a period of two hours. The advantages attendant thereupon are obvious.

In order to record sound upon the tape it is necessary to alter the magnetic status thereof. This is commonly accomplished by passing a concentrated magnetic flux through the tape and by varying the intensity of that flux in proportion to the sound vibrations. In the past, localization and intensification of the flux has been accomplished by sliding the tape over a finger in contact therewith, the width of said finger being equal to the desired width of a sound track. Since this width is generally very small, on the order of a small fraction of an inch, the fingers used are not sturdy and the frictional effects between the tape and the fingers over which the tape slides act to wear down and ultimately destroy the tape and/or the fingers.

The magnetizing means B and contacting means C of my invention are designed to overcome the above two defects. One energizing part of the magnetizing means B comprises a coil 78 surrounding an iron core 82, which core, where it passes through the coil 78, is insulated therefrom by means of insulating sheath 84. The forward extremity 86 of the core is of cross-sectional diameter similar to that of the insulating sheath 84 and passes through an orifice 88 in a yoke 90. The core at its rear extremity 92 (see Fig. 6) terminates in a screw to which is attached a guide rod 94, a washer 96 being fastened between the two. The guide rod 94 passes through orifice 98 disposed in yoke 90 opposite to but in registration with orifice 88. The ends of the coils are protected by rings of insulating material 100, 102.

The yoke 90 is provided with ears 104, 106 each of which is provided with orifices 108, 110. The internal surface of orifice 108 is smooth and shaft 112 attached to the housing 114, which housing is part of the framework 12, passes therethrough in such a manner that the yoke 90 is free to slide thereover. The internal surface of orifice 110 is screw-threaded, and threaded shaft 116 is screwed thereinto. This shaft at its upper end is rotatably mounted in bushing 118 of housing 114 and is attached thereto by means of screw 120, the washer 122, and the yoke return knob 124 in such manner that the knob 124 and the shaft 116 are maintained in fixed rotational relationship one with respect to the other. The lower end of the shaft 116 is rotatably mounted in base plate 126 of the framework 12 in a manner hereinafter to be described.

It will thus be apparent that upon rotation of the shaft 116, the screw thread thereon cooperating with the internally threaded surface of the orifice 110 will cause the yoke 90 to move up or down in a direction parallel to the axes of the shafts 112 and 116, and since the core 82 and the guide rod 94 attached thereto project through the yoke 90, the coil 78 and the core 82 will also move in the same direction and the same amount.

The contacting means C, which is here shown as a disc, is of magnetizable material similar to that of the core 82 and is mounted in the extremity 86 thereof so as to be rotatable within orifice 128 thereof (see Fig. 6) about axis pin 130. It will be seen from an inspection particularly of Figs. 5 and 6 that with this construction, as the tape A moves over the drum D the disc C in contact therewith rotates about axis pin 130, in this manner minimizing almost completely any frictional effect between the disc C and the tape A and thus promoting the long life of both elements.

The drum D is so constructed as to assist in the recording of sound tracks on the tape A. It comprises a coil 132 mounted upon an insulating base 134, both coil 132 and base 134 being fastened to shaft 32 for rotation therewith. The outer surfaces of the coil 132 are completely surrounded by a soft iron cap 136 which defines the outer surface of the drum D. The cap 136 also rotates with the shaft 32 and extends into groove 138 in the top of shaft 32 so as to prevent the coil 132 from being removed over the top of the shaft 32.

Two embodiments of the cap 136 are here illustrated, that of Figs. 1 through 7 having a number of circumferential ribs F thereon, and that of Fig. 8, the outer surface of which is smooth.

In the embodiment employing the ribs F, each of these ribs is preferably of closely the same width as the desired width of a sound track and each of the ribs F is spaced from the adjacent ribs F by an amount closely equal to the desired spacing of the sound tracks. The disc C carried by the magnetizing means B is generally of a width somewhat greater than that of a rib F, thus imparting additional structural strength and therefore durability to said disc, but is of width small enough so as not to be simultaneously registrable with more than one of the ribs F. Thus by reference to Fig. 6 it will be seen that when the disc C is substantially in registration with the lowermost rib F on the drum D, the upper and lower edges of the disc C extend respectively above and below the upper and lower edges of the rib F with which it is in registration, but the upper edge of the disc C is nevertheless below the lower edge of the rib F next above the rib F with which the disc C is in registration.

Since the characteristic of magnetic flux is to take the path of least resistance, and since the rib F is the closest soft iron portion to the disc C, substantially all of the flux coming from the disc C will pass to the rib F with which it is in registration, and thus the width of the rib F and its position with respect to the tape A will determine the width of a sound track impressed upon the tape A and its position thereon. The amount of leakage flux from the disc C to the rib F adjacent to the rib F with which the disc C is in registration will be insufficient to materially effect the magnetic status of the tape at that point.

In the drum embodiment illustrated in Fig. 8, the surface of the drum D over which the tape A passes is not ribbed but is smooth. With such a construction, in which there are no ribs F to control the width of a sound track, the disc C must consequently perform that function. In order for the disc C to be of sufficient structural strength at its center, about which it rotates, it must, as a practical matter, be of thickness substantially greater than the desired width of a sound track. Consequently, the peripheral edge 156 of the disc C is tapered to a thickness corresponding to the desired width of the sound track, by which expedient sound track width is defined and at the same time rolling contact and hence lack of wear on the tape A is achieved.

Connections to the coil 78 may be made in any conventional flexible manner since that coil is movable up and down to only a limited degree. Coil 132, however, rotates constantly with the drum D. Electrical connections therewith are obtained in the following manner: Embedded in the insulating base 134 are a pair of concentric conducting rings 140 and 142, each of these rings being suitably connected to an appropriate end of the coil 132. Mounted in the base plate 144, a part of the framework 12, directly thereunder, are a pair of ball contacts 146 and 148, each making contact with rings 140 and 142 respectively. To facilitate rotation of the drum D, each of the ball contacts 146 and 148 are adapted to rotate over ball bearings 150 which are in turn in contact with terminal leads 152 and 154.

The two coils 78 and 132 are so connected as to aid one another, and the intensity of the variations in the currents in said coils determines the intensity of the variations in the magnetic flux which passes from core 82 to magnetizing disc C, through the tape A to a selected rib F on the drum D, through the center of the coil 132 and thence via air and various parts of the apparatus structure back to the core 82. Since all of the magnetic flux passes between the disc C and the rib F in registration therewith, the flux at that point is of an extremely high concentration and is therefore sufficient to accurately and controllably alter the magnetic status of the tape A, thus impressing thereon a magnetic sound track.

In order to maintain the contacting means C in contact with the tape A and in order to enable it to conform to any surface irregularities which the tape A may present, the guide rod 94, core 82 and disc C are all urged toward the tape A and drum D by means of spring 158.

*Sound track selection means*

From the above description it is clear that in order for the magnetizing means B acting through the contacting means C to form a sound track along a definite path on the tape A, the contacting means C must be in registration with a selected one of the ribs F on the drum D. It has also been explained how the yoke 90 and consequently the magnetizing means B and the contacting means C may be moved up and down transversely with respect to the tape A by means of rotation of threaded shaft 116 which is engaged with the internally threaded orifice 110 of the yoke 90. The means for controlling the rotation of the shaft 116 and consequently the position of the magnetizing means B and contacting means C with respect to the drum D and the ribs F thereon, comprise the track selection means G, a schematic representation of which is shown in Fig. 4.

As previously stated, the lower extremity of shaft 116 is rotatably mounted on base plate 126. Attached to the shaft 116 above the plate 126 is a ratchet 160 above which is mounted a cam 162 for purposes hereinafter to be explained. Above the cam 162 a clock spring 164 has one end attached to the shaft 116 by means of screw 166 and has its other end attached to a rod 168 which may be the lower extremity of the shaft 112. The spring 164 is constantly under tension and tends to rotate shaft 116, ratchet 160, cam 162 and the yoke return knob 124 attached to the shaft 116 in such a manner as to cause the yoke 90 and consequently the magnetizing means B and the contacting means C to rise within the housing 114. Although the core 82 and the magnetizing means B project out through an aperture 170 in said housing 114, the upward motion is permitted within limits by the elongation of the aperture in a vertical direction (see Fig. 2).

Rotation of the shaft 116 as urged by the spring 164 is prevented by the engagement of dog 172 carried by pawl 174. This pawl is pivotable about pin 176 and carries on the other side of pin 176 from dog 172 a second dog 178. Push rod 180 actuates the pawl 174. In Fig. 4 it is shown in its position farthest to the left. Should the rod 180 be pushed in the direction of the arrow in Fig. 4, pawl 174 would pivot about pin 176 and dog 172 would be removed from engagement with the ratchet 160. With the removal of this restricting force, the spring 164 is free to rotate the shaft 116 and does so, raising the yoke 90, the magnetizing means B and the contacting means C.

When the rod 180 was pushed in the direction of the arrow, not only was dog 172 removed from engagement with the ratchet 160, but dog 178 was moved into position where it would prevent the passage beyond it of the next notch in the ratchet 160. Thus, rotation of the shaft 116 and hence of the ratchet 160 could continue only until the next notch of the ratchet 160 came into contact with the dog 178 of the pawl 174 at which time such motion would stop. It will be apparent that by suitable design of the pawl 174 and the ratchet 160, the rotation permitted could be made sufficient to raise the magnetizing means B and the contacting means C just enough to come into registration with the next higher rib F on the drum D, or in other words, to rise just enough to come into position appropriate for the recording of the next sound track.

Reciprocation of the rod 180 would allow continued intermittent rotation of the shaft 116 and consequent rise of the yoke 90 until all the sound tracks on the tape A have been made. At this point the projecting portion 86 of the core 82 would have reached the upper extremity of the elongated aperture 170 in the housing 114 and could rise no more. At such a time arm 182 on cam 162 will come into contact with roller 184. Since the arm 182 is so shaped that roller 184 cannot pass it, rotation of the cam 162 and consequently of shaft 116 is prevented.

To reset the device, the cover 4 is removed from the chassis 2 and the yoke return knob 124 is rotated by hand, rotating the shaft 116 in a direction such that the yoke 90 descends and the spring 164 is rewound. Obviously, the pawl 174 and ratchet 160 will not prevent rotation in that direction. By means of a suitable scale on the knob 124 (see Fig. 1) the magnetizing means B and contacting means C can be brought into registration with any desired sound track or can be run all the way down to the lowermost sound track, at the will of the operator.

*Retracting means*

If, when the contacting means C is moved from one sound track position to another, it is caused to slide transversely across the tape A, undesirable strains may be set up therein which would lead to eventual breakage of the disc C or of its shaft 130, and wear of the tape A would obviously occur. Consequently, it is exceedingly desirable that an automatic means be provided to retract the contacting means C from its contact making position with respect to the tape A, toward which it is urged by spring 158, during such time that it is being moved from one sound track position to another, and to restore said contacting means C to its contact making relationship with the tape A when it is once again in registration with a sound track.

This means, generally designated as H, comprises a rod 186 which rides in a notch 188 in the extremity of the guide rod 94.

The core 82 and insulating sheath 84 are mounted in the coil 78 so as to be axially slidable therein. Similarly, the extremity 86 of core 82 and the guide rod 94 attached to the other extremity thereof are slidable in the apertures 88 and 98 respectively of the yoke 90. Consequently, the action of the spring 158 is effective to slide the core assembly through the coil 78 and yoke 90 and thus maintain contact between the contacting means C and the tape A. The washer 96 prevents excessive forward movement of the core 82.

Should the rod 186 be moved to the right, it would draw the guide rod 94, the core 82 thereto attached, and the contacting means C to the right away from contact with the tape A.

Such a motion of the rod 186 is accomplished as follows: The periphery of the cam 162 (see Fig. 4) is largely composed of a series of depressions 190 in an otherwise circular disc. Riding on the circumference of the cam 162 is the roller 184 which is attached to the plate 192 pivoted about shaft 194 mounted at its lower end in base plate 126 and at its upper end in housing 114 (see Fig. 2). Extending upwardly from said plate 192 is the rod 186.

It will thus be apparent that when the roller is in any one of the depressions 190, the plate 192 will be pivoted counter-clockwise and consequently the rod 186 will be moved to the left, thus enabling the contacting means C to make contact with the tape A. If, however, the roller 184 is on a non-depressed portion of the circumference of the cam 162, the plate 192 will be pivoted clockwise and the rod 186 will be moved to the right and consequently the contacting means C and the core 82 will be moved thereby to the right against the pressure of spring 158 and out of contact making relationship with the tape A.

Since the cam 162 rotates with the ratchet 160 and the shaft 116, it is apparent that the depressions 190 can be so placed about the periphery of cam 162 that said depressions 190 correspond to the positions of the shaft 116 where the contacting means C is in registration with a sound track and the non-depressed portions of the periphery of the cam 162 represent positions of the shaft 116 where the contacting means C is not so in registration. Thus, whenever the shaft 116 is rotated to move the contacting means C from one sound track position to another, the plate 192 will automatically be pivoted clockwise and the contacting means C will thus automatically be removed from contact-making relationship with the tape A until said contacting means C comes into registration with the next sound track.

*Actuating means*

For continuous operation of my apparatus from one sound track to another, it is necessary to have an actuating means therein, generally designated as J, which will, at a predetermined time in the operation of the machine, automatically actuate the sound track selection means G and the retracting means H.

This actuating means may comprise a pair of solenoids 196 and 198 suitably mounted in the apparatus. The armatures 200 and 202 thereof are connected by pins 204 to the opposite ends of a T-bar 206 which itself pivots about pin 208. The shank of the T-bar 206 is pivotally connected by means of link 210 and pin 211 to the rod 180 which controls the position of the pawl 174. The pin 208 is supported in bar 212 which is in turn supported by plate 214 suitably attached to the framework 12 (see Fig. 4).

It will be apparent from a study of the linkage that if either one of the solenoids is actuated, the rod 180 will be moved in one direction or the other thus causing the pawl 174 to release the ratchet 160 and permit rotation of the shaft 116 until the contacting means C has come into registration with the next sound track.

The solenoid is actuated by the interaction of three switch arms 216, 218 and 220 (see Fig. 1). Switch arm 216 is maintained in the apparatus directly below the magazine 58. It is pivotable about pin 222 and is urged into pivotal motion by means of toggle-type spring 224 to one end of which is firmly attached to lug 226 of the framework 12. Projecting upwardly from the switch arm 216 is a roller 228 which is adapted to project up through a suitable cut-away portion in the lower surface of the magazine 58 and engage with the tape on the spool 60 or 62. As will be apparent from a study of Fig. 1, the roller 228 will always be urged into contact with that one of the spools 60 or 62 which has the least amount of tape wound thereon. The roller 228 is in Fig. 1 in contact with the tape on the spool 60. As that spool winds tape upon itself, the roller 228 will be forced to pivot about pin 222 in a clockwise direction. The design of the structure is such that as soon as spool 60 winds enough tape onto itself, so that it has more tape than spool 62, the switch arm 216 will have pivoted clockwise sufficiently so that the toggle spring 224 will no longer be urging the switch arm 216 into counter-clockwise rotation, as is the case in Fig. 1, but will now urge the switch arm 216 into clockwise rotation. Consequently the roller 228 will be shifted clockwise into contact with the tape on the spool 62, the unwinding spool.

The two switch arms 218 and 220 are pivotally mounted on pins 230 and 232 respectively. Their extremities are joined by spring 234, which spring constantly tends to draw them together, thus tending to rotate switch arm 218 counter-clockwise and switch arm 220 clockwise. This rotation is limited by means of stop pins 236 and 238. Each of these switch arms has three contacts 240 thereon. Switch arm 216 is provided with a single contact 242.

It will be apparent that as the tape from the spool with which the roller 228 is in contact unwinds, the contact 242 of switch arm 216 will contact the upper, the middle, and the lower contact 240 of switch arm 218 or 220 depending upon which direction the switch arm 216 is urged. The first and the second of the contacts 240 with which contact is made may energize suitable warning lights 241, 243 attached either to the microphone 22 or the control panel 20 to indicate to the recorder that the amount of magnetic tape available is approaching the end of its run. The third contact 240 with which the contact 242 comes into registration actuates one or the other of the solenoids 196 and 198 depending upon which switch arm, 218 or 220, the contact 242 and the switch arm 216 is urged against.

Thus, as tape is unwound from one of the spools in the magazine, the roller 228 on switch arm 216, urged by spring 224, follows the unwinding. As the unwinding approaches its end, contact is made between contacts 242 and the upper of the contacts 240 to light a yellow warning light 241 indicating to the recorder that he has, for example, three minutes to go. As the unwinding proceeds, contact is made with the middle one of the contacts 240 and a second lamp of red color 243 is lighted indicating to the recorder that he has, for example, one minute to go. As the unwinding proceeds still further to the end of the sound track, contact is made with the lower of the contacts 240 which by energizing a selected solenoid 196, 198 causes the magnetizing means B and the contacting means C to move up into registration with the next higher rib F on the drum D, ready to record another sound track on the same tape.

All these operations would be in vain were the motor E to be permitted to continue to run, for in such a case the tape would unwind completely from the unwinding spool and the magazine would have to be removed in order to thread the tape on the spool. Consequently, means are provided so that whenever either one of the solenoids 196 or 198 are actuated, the direction of rotation of the motor is reversed. This is accomplished by means of a pair of mercury switches 244 and 246 which comprise a double-pole double-throw switch controlling the direction of rotation of the motor E (see Fig. 3). These two switches are secured in cradle 248 by means of retaining plate 250 and screw 252. The cradle is mounted in bracket 254 so as to be rotatable about axis shaft 256. Attached to link 210 in addition to rod 180 is rod 258 (see Figs. 2 and 3), which is in turn connected to cradle 248 by having the elbow extremity 260 of said shaft 256 inserted into orifice 262 in said cradle. Consequently energization of either one of the solenoids 196 or 198 will result in longitudinal motion of link 210 and consequently the rod 258 will move, tilting the cradle 248, actuating the double-pole double-throw switches 244 and 246 and thus reversing the rotation of the motor.

In order to provide for positive positioning of the cradle 248, a detent means is provided therein comprising shaft 264 provided with shoulder 266 against which spring 268 operates in order to force the rod 264 into suitable detent orifices 269 in the bracket 254. The end of the spring 268 opposite from the end which bears against the shoulder 266 is held in position inside the cradle 248 by the elbow extremity 260 of the rod 258.

*Operation-recording*

The sound recording and reproducing apparatus of my invention has been described above with primary regard to its manner of performing the function of recording, that is, the transformation of variations in sound intensity and pitch into similar variations of the magnetic status of the portion of the tape A. In order to have the apparatus carry out this function, the following procedure is resorted to: The cover 4 is removed and by rotation of the yoke return knob 124, the yoke 90 and consequently the magnetizing means B and the contacting means C are moved to their lowest position. A tape-containing magazine 58 is then placed on the apparatus, being positioned at least in part by the pin 72 fitting into a suitable orifice in the magazine 58. The portion of the tape A exposed by the cut-out part 70 of the magazine 58 is then threaded around the pulleys 74 and 76 and the drum D. The cover 4 is replaced and the apparatus is ready for operation.

The access door 14 is opened, the microphone 22 is removed therefrom in order to be spoken into and a suitable switch closes an electric circuit to the motor, whereupon the motor commences to rotate.

At the same time a selector switch, not shown, is placed in the "record" position, thus connecting the coils 78 and 132 in series with a power supply source and with the microphone 22. Consequently, sound vibrations entering the microphone 22 modulate the current flowing in the coils 78 and 132 and thus alter the magnetic flux induced by them in the magnetizing means B as previously described. This flux is concentrated by means of the contacting means C and, in one embodiment of the invention, the ribs F on the drum D, into a small area of the tape A, consequently affecting the magnetic status of that tape over only a small portion thereof coincident with the rib F with which the contacting means C is in registration.

The motor E drives the drum D at a constant speed and also drives the appropriate one of the spools 60, 62 (that one which has the least tape thereon), thus winding the tape from one spool to another. By means of the corresponding drive and clutch assembly 46, 46' the unwinding spool 60 or 62 is free to rotate.

Hence the tape moves at a constant speed past the contacting means C so that the modulations in the magnetic flux passing therethrough create corresponding changes in the magnetic status of the tape longitudinally thereof and over only a small portion transversely thereof, thus defining a sound track.

As the recording continues the switch arm 216 is brought into contact with the strip on the unwinding spool and the contact maker 242 makes contact with the uppermost of the three contacts 240 on one of the switch arms 218 or 220. This occurs when the unwinding of the tape has only a predetermined amount of time remaining and the yellow warning light 241 is lighted, thus indicating to the recorder that he is approaching the end of a tape.

As the unwinding continues the contact 242 breaks contact with the uppermost of contacts 240 and then makes contact with the middle one of said contacts, thus lighting a red warning light 243 indicating to the recorder that the sound track is practically at its end.

As the unwinding continues further the contact 242 makes contact with the lowermost of the contacts 240 thus energizing the appropriate one of the solenoids 196 and 198. Thereupon, by reason of the linkages and mechanism above described, the contacting means C is withdrawn from its contact with the tape A, the magnetizing means B and contacting means C are moved upward transversely with respect to the tape A to the second sound track position (into registration with the second rib F on the drum D), the direction of rotation of the motor E is reversed, and consequently, the drum D rotates in the opposite direction, the spool which was formerly the unwinding spool is driven in the opposite direction to become the winding spool, and the spool which was formerly the winding spool is declutched from the driving mechanism and permitted to rotate freely. Recording may then be continued to form a second sound track on the tape.

The above process may be repeated either consecutively or with any desired interruptions until all or a part of the possible sound tracks on the tape A have been formed.

*Operation-reproduction*

The same apparatus may be employed for reproduction. As a selector switch on the control panel 20 is thrown to the "reproduce" position, the coils 78 and 132 are energized and connected in the manner well-known in the art so that movement of the previously magnetized tape A past the contacting means C and the magnetizing means B will, by electromagnetic induction arising from the variations of the magnetic status of the tape along its length, vary the currents in said coils, which variations may be suitably amplified and transmitted to a loud speaker, whereby reproduction is effected.

If it is desired that all of the sound tracks on the tape A be reproduced in the order in which they were recorded, the sequence of operations for reproduction are the same as those for recording except that the selector switch is, as has been mentioned, placed in the "reproduce" position rather than in the "record" position.

If reproduction of only a given one of the sound tracks is desired, the cover 4 of the apparatus is removed and by suitable rotation of the yoke return knob 124, the magnetizing means B and contacting means C are placed into registration with the desired sound track. A suitable scale on the top of the knob 124 in cooperation with an index mark 270 on top of the housing 114 facilitates this selection (see Fig. 1).

*Operation-erasing*

It may be desired, after the recorded sound track has served its purpose, to destroy that track and leave the tape A ready for subsequent recording. Such a step is well-known in the art as "erasing," and is desirable in situations where my apparatus is used as a means for recording dictation, as in business offices. Once the dictation has been transcribed by the stenographer, there may be no further purpose in preserving the recording.

In order to accomplish this "erasing" the selector switch (not shown) on the control panel 20 is thrown to the "erase" position, thus so energizing the coils 78 and 132 that as the tape A is rotated past them, the magnetic status of the tape A is restored to its original condition ready for subsequent recordation.

There are many variations for circuit connections for the steps of recording, reproducing and erasing, all of which are well-known in the art. None of them are shown here since my present invention resides in the mechanical apparatus for achieving these results.

The rolling contact between the disc C and the tape A is of prime importance, since it materially lengthens the life of the tape and of the contacting means C while at the same time ensuring, by minimizing flux leakage losses through the air, a maximum magnetic intensity impressed upon the tape A, thus ensuring fidelity of recording. The peripheral width of the disc C, in conjunction with the width of the ribs F, where used, substantially define the width of the sound track impressed on the tape A, which in turn is fixed in axial position on the drum D by means of the flanges 89 on the rollers 74 and 76, consequently permitting recording of a larger number of such sound tracks upon the tape, the tracks being spaceable closely with respect to one another without interference with one another so that a given tape may be most economically used. The fact that a large number of sound tracks may be recorded on a single tape by the use of the apparatus of my invention not only enables economical use of the tape but also, in conjunction with the automatic reversing and track selection means, enables a single tape to record or reproduce for a long period of time. This is of particular importance with respect to reproduction. An entire opera or symphony might be recorded on a single tape and, once the apparatus is set into motion, the entire musical offering can be reproduced without undue delay in the shifting from one sound track to another, and without the necessity of manual intervention in any way by the auditor. The commercial advantages of such an apparatus are obvious.

It will be apparent that many modifications may be made in the structure above disclosed without departing from the spirit of the invention as defined in the following claims:

I claim:

1. In a magnetic sound recording and reproducing apparatus, a magnetizable medium on which at least one continuous sound track is to be recorded and reproduced, a magnetizing means cooperating with the magnetic status of said magnetizable medium so as to record and reproduce said sound track, means to move said magnetizable medium longitudinally past said magnetizing means, and contacting means between said magnetizing means and said magnetizable medium comprising a magnetizable body rotatably mounted in said magnetizing means so as to rotate freely about an axis of rotation perpendicular to said continuous sound track and thus contact said magnetizable medium and freely roll thereover along a line defining said continuous sound track as said magnetizable medium moves longitudinally past said magnetizing means.

2. In a magnetic sound recording and reproducing apparatus, a magnetizable medium on which at least one continuous sound track is to be recorded and reproduced, a magnetizing means cooperating with the magnetic status of said magnetizable medium so as to record and reproduce said sound track, means to move said magnetizable medium longitudinally past said magnetizing means, and contacting means between said magnetizing means and said magnetizable medium comprising a magnetizable disc rotatably mounted in said magnetizing means so as to rotate freely about an axis of rotation perpendicular to said continuous sound track and thus contact said magnetizable medium and freely roll thereover along a line defining said continuous sound track as said magnetizable medium moves longitudinally past said magnetizing means.

3. In a magnetic sound recording and reproducing apparatus, a tape on which at least one continuous sound track is to be recorded and reproduced, a magnetizing means cooperating with the magnetic status of said tape so as to record and reproduce said sound track, means to move said tape longitudinally past said magnetizing means, and contacting means between said magnetizing means and said tape comprising a magnetizable body of a width at its contact circumference closely equal to the desired width of the sound track freely rotatably mounted in said magnetizing means so as to roll over said tape as it moves longitudinally past said magnetizing means and thus contact said magnetizable medium and freely roll thereover along a line defining said continuous sound track.

4. In the magnetic sound recording and reproducing apparatus of claim 1, a magnetizable medium in the form of a tape and means to cause said tape to move longitudinally past said magnetizing means comprising a drum the driving surface of which carries at least one circumferential rib of a width closely the same as the desired width of the sound track, and means to bring the magnetizing means into registration with said rib.

5. In the magnetic sound recording and reproducing apparatus of claim 1, a magnetizable medium in the form of a tape and means to move said tape longitudinally past said magnetizing means comprising a drum the driving surface of which carries a plurality of spaced circumferential ribs each of a width closely the same as the desired width of the sound track, said rotatable magnetizable body being of a width at its contact circumference closely equal to the desired width of the sound track and means to bring the magnetizing means into selective registration with said ribs.

6. In the magnetic sound recording and reproducing apparatus of claim 1, a magnetizable medium in the form of a tape and means to move said tape longitudinally past said magnetizing means comprising a drum the driving surface of which carries a plurality of spaced circumferential ribs each of a width closely the same as the desired width of the sound track, the rotatable magnetizable body being of a width at its contact circumference less than the sum of the widths of one of said ribs plus the width of the valleys on either side thereof.

7. In a magnetic sound recording and reproducing apparatus, a support, a tape on which a plurality of magnetic sound tracks are longitudinally disposed and transversely spaced one from the other, a drum of magnetizable material rotatably mounted on said support around a portion of which drum said tape is wound, a disc of magnetizable material in contact with said tape on the other side thereof from said drum, a mounting means of magnetizable material for said disc in which said disc is mounted so as to be rotatable about an axis parallel to that of said drum, means to move said tape past said disc, means to magnetize said mounting means and said disc and thereby to cooperate with the magnetic status of said tape so as to record and reproduce sound, and track-selection means to move said disc and its mounting means in a direction parallel to the axis of said drum.

8. In a magnetic sound recording and reproducing apparatus, a support, a tape on which a plurality of sound tracks are longitudinally disposed and transversely spaced one from the other, a drum of magnetizable material rotatably mounted on said support around a portion of which drum said tape is wound, said drum carrying on the surface thereof which contacts said tape a plurality of circumferential ribs each of a width closely the same as each sound track and each spaced from one another closely as the sound tracks are spaced, a disc of magnetizable material in contact with said tape on the other side thereof from said drum, a mounting means of magnetizable material for said disc in which said disc is mounted so as to be rotatable about an axis parallel to that of said drum, driving means to move said tape past said disc, means for magnetizing said mounting means and said disc and thereby to cooperate with the magnetic status of said tape to record and reproduce sound, and track-selection means to move said disc and its mounting means transversely of said tape into selective registration with said ribs.

9. In the magnetic sound recording and reproducing apparatus of claim 7, retracting means to move the disc from its contact-making position with respect to the tape while said disc is being moved in a direction parallel to the axis of said drum.

10. In the magnetic sound recording and reproducing apparatus of claim 8, retracting means to move the disc from its contact-making position with respect to the tape when said disc is not in registration with one of said ribs and to restore said disc to its contact-making position when it is in registration with one of said ribs.

11. In the magnetic sound recording and reproducing apparatus of claim 7, spools on which the tape is carried and means controlled by the amount of tape on said spools to actuate said track-selection means, whereby said disc is automatically moved from one sound track position to another at a predetermined time.

12. In the magnetic sound recording and reproducing apparatus of claim 8, spools on which the tape is carried, retracting means to move the disc from its contact-making position with respect to the tape when said disc is not in registration with one of said ribs and to restore said disc to its contact-making position when it is in registration with one of said ribs, and means controlled by the amount of tape on said spools to actuate said track selection and said retracting means, whereby said disc is automatically moved from one sound track position to another at a predetermined time.

13. In the magnetic sound recording and reproducing apparatus of claim 7, spools on which the tape is carried and means controlled by the unwinding of the tape from said spools to actuate said track selection means, whereby said disc is automatically moved from one sound track position to another at a predetermined time.

14. In the magnetic sound recording and reproducing apparatus of claim 8, spools on which the tape is carried, retracting means to move the disc from its contact-making position with respect to the tape when said disc is not in registration with one of said ribs and to restore said disc to its contact-making position when it is in registration with one of said ribs, and means controlled by the unwinding of the tape from said spools to actuate said track selection and said retracting means, whereby said disc is automatically moved from one sound track position to another at a predetermined time.

15. In the magnetic sound recording and reproducing apparatus of claim 7, spools on which the tape is carried, reversing means to reverse the direction of rotation of said driving means, and means controlled by the amount of tape on said spools to actuate said track selection means and said reversing means, whereby said disc is automatically moved from one sound track position to another and the direction of rotation of the driving means is automatically reversed at a predetermined time.

16. In the magnetic sound recording and reproducing apparatus of claim 8, spools on which the tape is carried, reversing means to reverse the direction of rotation of said driving means, retracting means to move the disc from its contact-making position with respect to the tape when said disc is not in registration with one of said ribs and to restore said disc to its contact-making position when it is in registration with one of said ribs, and means controlled by the amount of tape on said spools to actuate said track selection, said retracting, and said reversing means, whereby said disc is automatically moved from one sound track position to another and the direction of rotation of the driving means is automatically reversed at a predetermined time.

17. In the magnetic sound recording and reproducing apparatus of claim 7, spools on which the tape is carried, reversing means to reverse the direction of rotation of said driving means, and means controlled by the unwinding of the tape from said spools to actuate said track selection means and said reversing means, whereby said disc is automatically moved from one sound track position to another and the direction of rotation of the driving means is automatically reversed at a predetermined time.

18. In the magnetic sound recording and reproducing apparatus of claim 8, spools on which the tape is carried, reversing means to reverse the direction of rotation of said driving means, retracting means to move the disc from its contact-making position with respect to the tape when said disc is not in registration with one of said ribs and to restore said disc to its contact-making position when it is in registration with one of said ribs, and means controlled by the unwinding of the tape from said spools to actuate said track selection, said retracting, and said reversing means, whereby said disc is automatically moved from one sound track position to another and the direction of rotation of the driving means is automatically reversed at a predetermined time.

19. In a magnetic sound recording and reproducing apparatus comprising a tape of magnetizable material carrying a plurality of magnetic sound tracks longitudinally disposed thereon and spaced one from the other transversely with respect to said tape, a magnetizing means transversely movable with respect to said tape, and means to move said magnetizing means transversely with respect to said tape, the improvement in said last-named means which comprises an internally threaded support for said magnetizing means, a screw shaft rotatable in said threaded portion, spring means urging rotation of said screw shaft in one direction, ratchet means the rotation of which determines the rotation of said screw shaft, a pawl cooperating therewith to limit and control the rotation of said screw shaft, means controlled by the amount of tape on said spool to actuate said pawl, whereby a predetermined amount of rotation of said spring-urged screw shaft is permitted to move said magnetizing means in one direction from one sound track to another, and manual means for rotating said screw shaft in the other direction so that said magnetizing means will move in the other direction.

20. In the combination of claim 19, retracting means for moving said magnetizing means out of contact with said tape while said magnetizing means is moving from one sound track to another, and means actuating said retracting means comprising a cam rotation of which is determined by said ratchet, a cam follower, and linkage means connecting said cam follower to said retracting means.

21. In a magnetic sound recording and reproducing apparatus, a rotatable drum comprising a first coil and a cap of magnetizable material thereover, a tape on which at least one sound track is to be recorded and reproduced threadable around said cap in driven relation therewith, means for maintaining electrical contact with said first coil, a second coil, a core of magnetizable material axially slidable in said second coil, means for maintaining said core in contact with said tape and means for electrically connecting said two coils so that they assist one another in cooperating with the magnetic status of said tape so as to record and reproduce said sound track.

22. In a magnetic sound recording and reproducing apparatus, a rotatable drum comprising a first coil and a cap of magnetizable material thereover, a tape on which at least one sound track is to be recorded and reproduced threadable around said cap in driven relation therewith, means for maintaining electrical contact with said first coil, a second coil, a core of magnetizable material in said second coil, means for maintaining said core in contact with said tape and means for electrically connecting said two coils so that they assist one another in cooperating with the magnetic status of said tape so as to record and reproduce said sound track.

23. In a magnetic sound recording and reproducing apparatus, a rotatable drum comprising a first coil and a cap of magnetizable material thereover, a tape on which at least one sound track is to be recorded and reproduced threadable around said cap in driven relation therewith, means for maintaining electrical contact with said first coil, a second coil, a core of magnetizable material axially slidable in said second coil and supporting in its extremity nearest said tape a rotatable contacting means, means for maintaining said contacting means in contact with said tape, and means for electrically connecting said two coils so that they assist one another in cooperating with the magnetic status of said tape so as to record and reproduce said sound track.

24. In a magnetic sound recording and reproducing apparatus, a rotatable drum comprising a first coil and a cap of magnetizable material thereover, a tape on which at least one sound track is to be recorded and reproduced threadable around said cap in driven relation therewith, means for maintaining electrical contact with said first coil, a second coil, a core of magnetizable material in said second coil and supporting in its extremity nearest said tape a rotatable contacting means, means for maintaining said contacting means in contact with said tape, and means for electrically connecting said two coils so that they assist one another in cooperating with the magnetic status of said tape so as to record and reproduce said sound track.

25. The magnetic sound recording and reproducing apparatus of claim 21, in which the two coils may be connected to effect recording, reproducing and erasing.

26. In a magnetic sound recording and reproducing apparatus, a tape on which at least one sound track is to be recorded and reproduced, a magnetizing means cooperating with the magnetic status of said tape so as to record, reproduce and erase said sound track, means for moving said tape past said magnetizing means comprising a rotatable drum, said drum comprising a cap of magnetizable material around which the tape may be threaded and carrying on its tape-contacting surface a plurality of circumferential ribs each of a width closely equal to the desired width of a sound track, said magnetizing means being movable transversely with respect to said tape into selective registration with said circumferential ribs so as to record, reproduce and erase a plurality of sound tracks on said tape, and an electric coil surrounded by said cap defining an auxiliary magnetizing means.

27. A magnetic sound recording and reproducing apparatus comprising an elongated magnetizable medium on which a sound track is to be recorded and reproduced, a spool on which said medium is wound and from which it is adapted to be unwound, and a rotatable drum comprising a cap of magnetizable material around the exterior of which said magnetizable medium is threaded as it is unwound from said spool, and an electric coil within said cap defining a magnetizing means.

28. The apparatus of claim 27, in which said magnetizable medium is frictionally engaged by the exterior of said drum and said drum is rotated by a motor, thereby unwinding said medium from said spool.

29. In the apparatus of claim 27, a second magnetizing means active upon said magnetizable medium as said medium is threaded around said drum.

FREEMAN H. OWENS.

REFERENCES CITED

The following references are of record in the file of this patent:

UNITED STATES PATENTS

| Number | Name | Date |
|---|---|---|
| 882,329 | Lieb | Mar. 17, 1908 |
| 1,090,128 | Avers | Mar. 17, 1914 |
| 1,542,808 | Adams | June 23, 1925 |
| 1,642,681 | Kaplan | Sept. 20, 1927 |
| 1,942,504 | Wood | Jan. 9, 1934 |
| 2,188,650 | Clark | Jan. 30, 1940 |
| 2,213,631 | Heller | Sept. 3, 1940 |
| 2,352,023 | Schüller | June 20, 1944 |
| 2,364,556 | Somers | Dec. 5, 1944 |

FOREIGN PATENTS

| Number | Country | Date |
|---|---|---|
| 4,933 | Australia | Nov. 26, 1926 |